(12) United States Patent
Gutheim

(10) Patent No.: US 6,431,060 B1
(45) Date of Patent: Aug. 13, 2002

(54) CONTAINER FOR COOLING PERISHABLE GOODS

(75) Inventor: August William Gutheim, Chittenango, NY (US)

(73) Assignee: Carrier Corporation, Farmington, CT (US)

( * ) Notice: Subject to any disclaimer, the term of this patent is extended or adjusted under 35 U.S.C. 154(b) by 0 days.

(21) Appl. No.: 10/061,587

(22) Filed: Feb. 1, 2002

(51) Int. Cl.[7] .............................. A23L 1/00; A23L 3/00; A23B 7/00; A23B 7/144
(52) U.S. Cl. .............................. 99/475; 62/78; 62/329; 99/467; 99/476; 99/517
(58) Field of Search .......................... 99/352–355, 467, 99/468, 472, 473–476, 477, 484, 485, 516, 517, 534; 34/192, 194, 196, 222, 231; 62/329, 78, 89, 381, 408, 239, 179, 414, 419, 127, 141, 303, 374, 384; 165/65; 312/116, 236; 422/28, 40, 292; 426/316–320, 395, 419, 263

(56) References Cited

U.S. PATENT DOCUMENTS

| | | | | |
|---|---|---|---|---|
| 4,879,877 A | * | 11/1989 | Hicke | 62/329 X |
| 4,894,997 A | * | 1/1990 | Urushizaki et al. | 99/468 X |
| 5,318,789 A | * | 6/1994 | Nakagawa et al. | 426/316 |
| 5,373,780 A | * | 12/1994 | Bianco | 99/475 |
| 5,419,153 A | * | 5/1995 | Hartley | 99/468 X |
| 5,457,963 A | * | 10/1995 | Cahill-O'Brien et al. | 422/40 X |
| 5,566,608 A | * | 10/1996 | Vejdani et al. | 99/475 X |
| 5,623,105 A | * | 4/1997 | Liston et al. | 62/78 |
| 5,660,057 A | * | 8/1997 | Tyree et al. | 62/384 |
| 5,715,685 A | * | 2/1998 | Takasugi | 62/239 X |
| 5,778,557 A | * | 7/1998 | Leavens | 99/474 |
| 5,789,007 A | * | 8/1998 | Bianco | 99/468 X |
| 5,801,317 A | * | 9/1998 | Liston et al. | 99/468 |
| 6,012,384 A | | 1/2000 | Badalament et al. | |

* cited by examiner

Primary Examiner—Timothy F. Simone
(74) Attorney, Agent, or Firm—Wall Marjama & Bilinsk LLP

(57) ABSTRACT

An enclosed container having an air conditioning unit for providing conditioned air to the mixing plenum of an air handling system for circulating conditioned air through a load of perishable goods stored within the container. An open-sided supply duct is connected to the plenum that runs along the center of the length of the container and a pair of spaced-apart, open-sided return ducts pass along the side walls of the container parallel to the supply duct. A load of perishable goods is stacked between the ducts and blower units are mounted within the return ducts for drawing supply air through the load and returning the air into the mixing plenum at an increased pressure. The return air in the plenum is combined with conditioned air from the refrigeration unit and is circulated back into the supply duct for reuse in the system.

5 Claims, 2 Drawing Sheets

CONTAINER FOR COOLING PERISHABLE GOODS

FIELD OF THE INVENTION

This invention relates generally to apparatus for storing perishable goods and, in particular, for storing perishable goods at a desired temperature for preserving the goods over an extended period of time.

BACKGROUND OF THE INVENTION

As set forth in U.S. Pat. No. 6,012,384 to Badalament, et al., a mobile container for shipping perishable goods such as fruits and vegetables has been devised which helps to maintain the goods at or close to a desired temperature. Included in these goods are fruits and vegetables that are undergoing an exothermic ripening process which makes control of the internal container temperature difficult to maintain. The outside temperature of the surrounding ambient can also have a pronounced effect on the internal temperature of the container which again adversely effects the ripening process.

The container disclosed in the Badalament, et al. patent is an elongated sealed enclosure mounted on wheels so that the container can be transported by various means from place to place. A refrigeration unit is mounted on the front wall of the container and is arranged to deliver conditioned air at a desired temperature to an air mixing chamber that is located in the container adjacent to the front wall. The cargo is stacked in two rows extending along the length of the container to establish a pair of air delivery plenums extending back from the mixing chamber to the rear wall of the container along the side walls of the container. A central return plenum is similarly provided between the two rows of stacked goods. One or more fans are mounted in the mixing chamber which are arranged to pump conditioned air from the mixing chamber into the two delivery plenum. The conditioned air is pumped through the goods and then back into the mixing chamber via the return plenum.

The Badalament container represents an improvement in the art in that it enables the goods in transit to be exposed directly to conditioned air. However, as noted above, the blowers employed in the system are located in the mixing chamber and the conditioned air leaving the evaporator is warmed by the heat generated by the blower motors before the conditioned air reaches the goods that are to be cooled. This uncontrolled heating of the conditioned air prior to the conditioned air reaching the goods can have an adverse effect on the ripening process. In addition, the conditioned air is moved along the side walls of the container before reaching the goods. Depending on the ambient temperature surrounding the container, the conditioned air can be either heated or cooled as it moves over the side wall surfaces, again adversely effecting the ripening process. It should be further noted that the Badalament mixing chamber is located on the low pressure side of the container flow system which, under certain conditions, does not provide for the most efficient flow of air through the system.

SUMMARY OF THE INVENTION

It is, therefore, a primary object of the present invention to improve containers for storing and/or transporting perishable goods.

It is a further object of the present invention to provide an improved system for moving conditioned air through a container for storing perishable goods.

It is a still further object of the present invention to improve the mixing of conditioned air with return air in a container in order to maintain stored perishable produce at a desired temperature for controlled ripening of the produce.

Another object of the present invention is to improve the control of air temperature within a container in which perishable goods are stored.

Yet another object of the present invention is to reduce the number of uncontrollable variables that might adversely affect the air temperature within a container for storing and preserving goods.

These and other objects of the invention are attained in a sealed container that is coupled to a refrigeration unit for delivering conditioned air to a mixing plenum. The plenum is located within the container along the container's front wall. A load of perishable goods is stored in air penetratable bins or packages that are stacked in two spaced-apart rows extending from the mixing plenum rearwardly toward the back of the container. The stacks are arranged to form a central air supply duct that communicates with the mixing plenum through means of a supply air opening and a pair of return air ducts that extend along the two side walls of the container and which communicate with the mixing plenum through return air openings. Blower units are mounted in each return air duct and are arranged to draw air through the load from the supply air duct and deliver the air into the mixing plenum at an increased pressure. The low pattern that is established through the container is such that supply air from the mixing plenum reaches the goods before it moves over the side walls of the container and the blower motors. As a result, the temperature of the goods undergoing ripening can be closely controlled.

BRIEF DESCRIPTION OF THE DRAWING

For a further understanding of these and other objects of the invention, reference will be made to the following detailed description of the invention which is to be read in connection with the accompanying drawing, wherein.

DETAILED DESCRIPTION OF THE DRAWING

Figure 1:
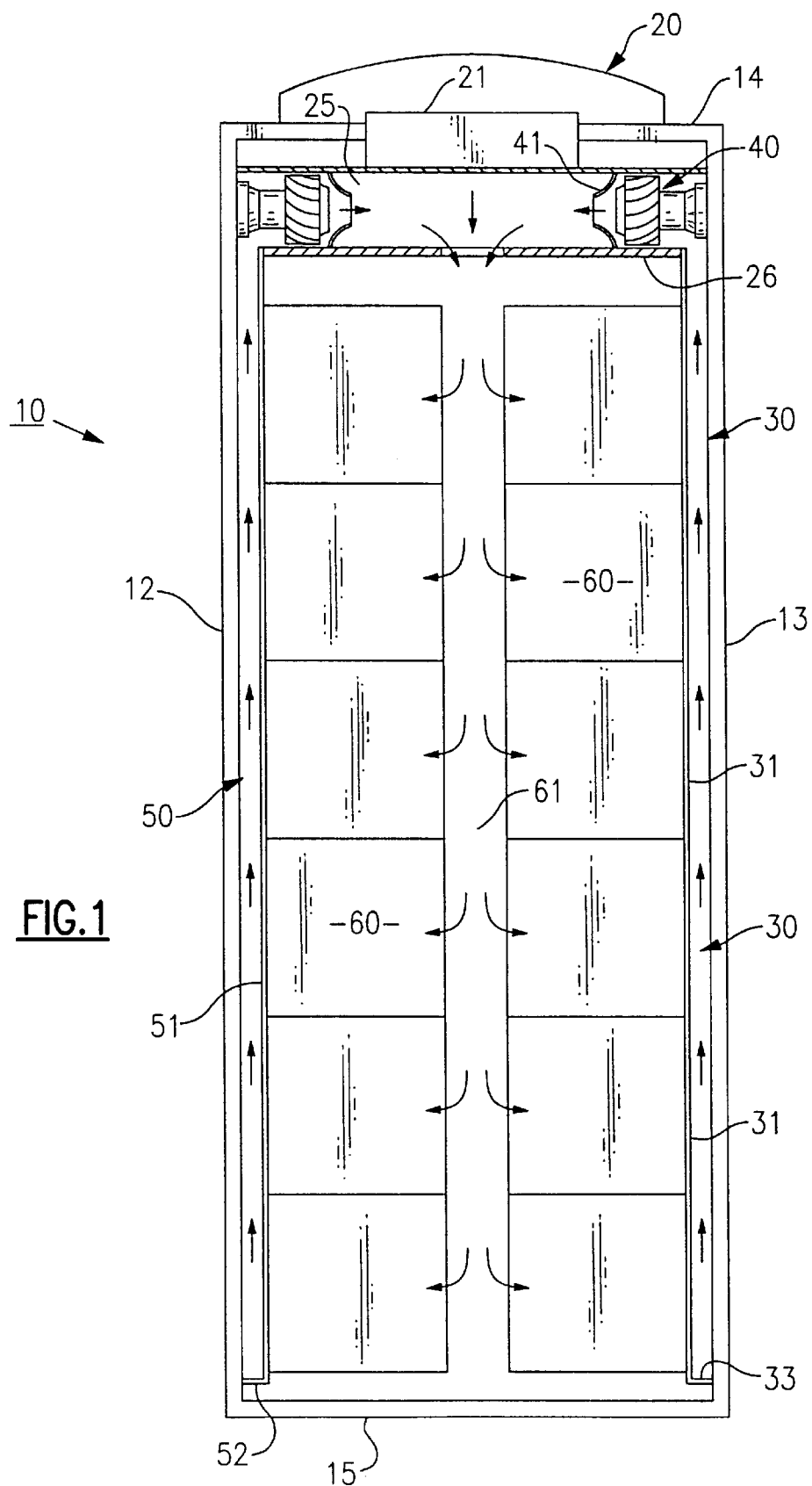
FIG. 1 is a schematic top view in a section of a container having an air handling system embodying the teachings of the present invention.

Turning now to the drawings, there is illustrated a mobile container, generally referenced 10, that embodies the teachings of the present invention. Although the present invention will be described with particular reference to a mobile container for transporting perishable goods, it has equal applicability as a stationary unit for storing such products. The container includes a pair of elongated side walls 12 and 13, a front wall 14 and a rear wall 15 that are enclosed by a bottom wall or floor 16 and a top wall 17. Although not shown, the rear wall is typically equipped with a pair of doors through which cargo can be loaded and unloaded from the container. The container is equipped with appropriate seals to render the container airtight so that it will retain conditioned air that is provided to the interior of the container by a refrigeration unit.

Figure 2:
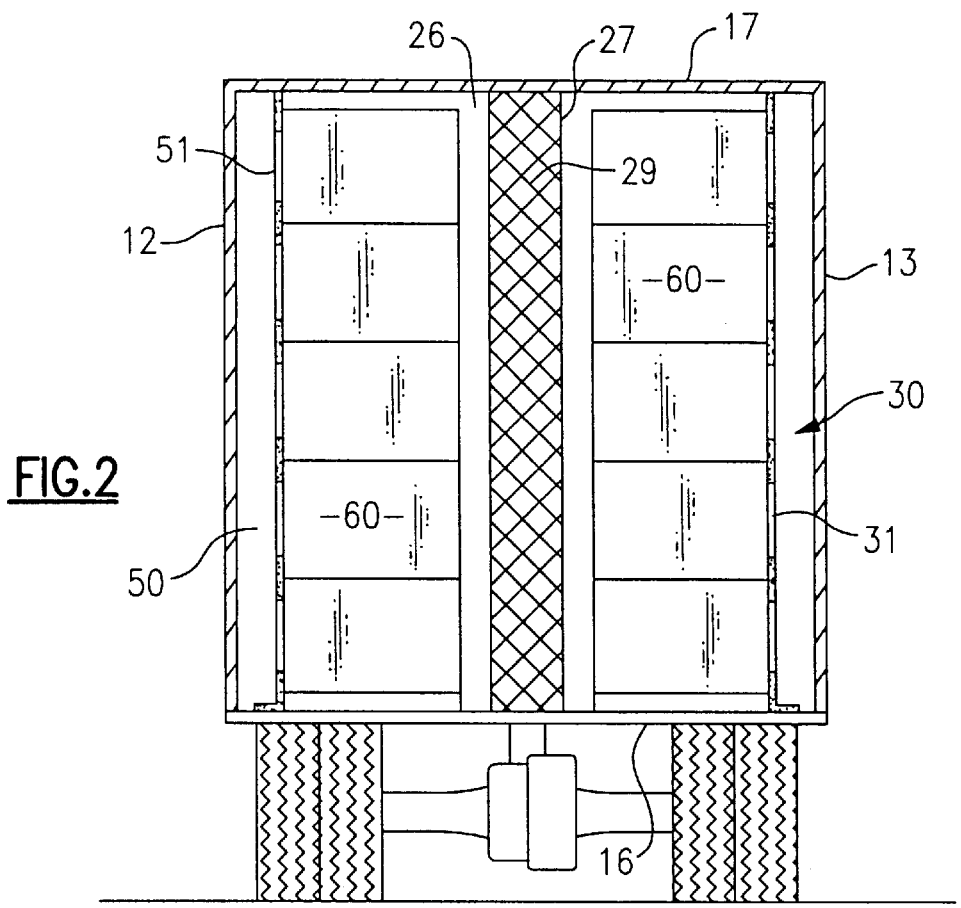
FIG. 2 is a rear schematic view in sections of the container illustrated in FIG. 1.

The refrigeration unit, generally referenced 20, is mounted upon the front end wall of the container which includes an evaporator that is arranged to provide conditioned air into the front area of the container through an appropriate opening in the front wall 14 of the container. Immediately adjacent to the front wall of the container is a mixing plenum 25 that includes a bulkhead 26 that extends from the floor of the container to the top wall 17. As best seen in FIG. 2, the bulkhead contains a centrally located discharge opening 27 that passes upwardly from the floor to the ceiling of the container. A grill 29 covers the discharge opening to prevent foreign matter from being exchanged between the plenum and the cargo bay.

A first return duct 30 extends along curbside wall 13 of the container so that the side wall forms one wall of the duct. An air penetratable wall 31 is spaced apart from the side wall 13 and runs parallel with the side wall along the length of the container. The rear end of the return air duct is closed by an adjustable back wall 33 which is slidably mounted upon the air penetratable wall 31 so that the back wall can be selectively positioned along the length of the container to vary the length of the return air duct.

Figure 3:
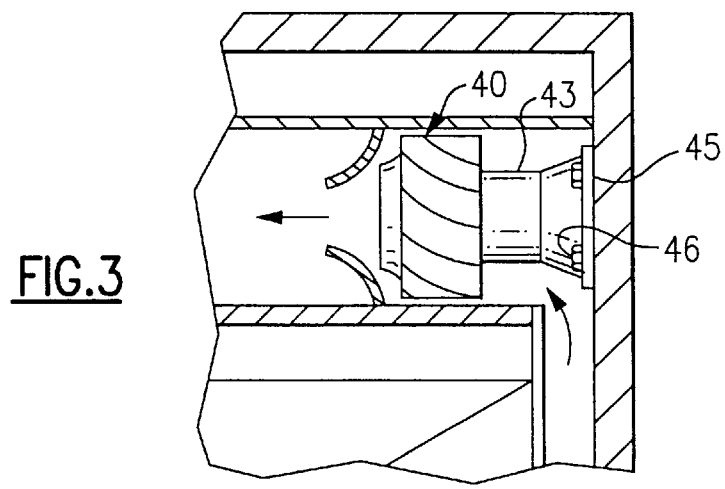
FIG. 3 is a partial enlarged sectional view illustrating a fan unit mounted within the return air duct of the system.

A series of stacked blower units 40 are contained in the front end of the return air duct. Each blower in the stack is arranged to draw a relatively high volume of air through the return air duct and deliver the air into the mixing chamber via nozzle 41 at a high volume rate of flow that is sufficient to elevate the pressure within the mixing plenum. The blowers are arranged one above the other so that the stack is fully contained within the return duct. As best illustrated in FIG. 3, each blower 40 includes an electrical motor 43 that is coupled to a suitable generator (not shown) mounted in a service bay outside the container beneath the refrigeration unit. Each motor is secured in a bracket 45 which is mounted upon the sidewall of the container by any suitable type fasteners 46. Preferably, the bracket and fasteners are constructed of a material having a high thermal conductivity so that the heat generated by the motor is transferred rapidly into the container side wall and thus rapidly dissipated to the surrounding ambient.

A second return air duct 50 is similarly arranged adjacent to the opposite roadside wall 12. Here again, an air penetratable wall 51 is spaced apart from the side wall of the container and a rear closure 52 is slidably mounted on wall 51 to regulate the length of the duct. Again, a stack of blower units 40 are fully contained in the front of the return air duct and are arranged to direct a high volume of air back into the mixing chamber.

A series of air permeable bins or boxes 60 are stacked in rows against each of the air penetratable walls of the two return air ducts to establish a supply air duct 61 between the rows. The supply air duct and the discharge opening of the mixing chambers are both aligned along the central axis of the container. The blower units, as noted above, are adapted to deliver a high volume of air into the mixing chamber thereby raising the pressure within the chamber to a level that is considerably greater than that in the return air ducts. Accordingly, under the influence of the blower units, the return air is well mixed with conditioned air. The high pressure supply air is circulated as indicated by the arrows in FIG. 1 through the produce contained within the boxes 60, thus bringing the produce to a desired temperature needed to promote the ripening process.

The return air that has passed through the cargo flows back along the side walls of the container. Depending upon the ambient temperature, heat is exchanged between the return air and the side walls of the container. As pointed out above, this heat transfer occurs after the conditioned air has treated the cargo and, therefore, has little or no effect upon the ripening process. By the same token, the heat generated by the blower units is also transferred into the return air flow and again has little or no effect upon the ripening process. The return air is delivered into the mixing chamber and is recirculated through the evaporator so that the temperature of the supply reaching the cargo can be more accurately maintained at a desired level. Because of the present flow pattern, the air flow through the cargo is increased considerably over prior art systems without having to increase the size of the evaporator.

While the present invention has been particularly shown and described with reference to the preferred mode as illustrated in the drawing, it will be understood by one skilled in the art that various changes in detail may be effected therein without departing from the spirit and scope of the invention as defined by the claims.

We claim:

1. A sealed enclosure for storing perishable goods as the goods ripen that includes:

a sealed closed container that includes opposed end walls and side walls, a top wall and a bottom wall, an air conditioning unit mounted at one end of said container that is arranged to provide conditioned air into a mixing chamber adjacent one end wall, a first open-sided air return duct extending along one side wall of said container, said first return duct having a first air penetratable wall spaced apart from said one side wall of said container and extending along the length of the container parallel to said one sidewall whereby a first row of perishable goods can be stacked against said first penetratable wall, a second open-sided air return duct extending along an opposite side wall of the container said second return duct having a second air penetratable wall spaced apart from the opposite side wall of said container and extending along the length of said container parallel to said opposite side wall whereby a second row of perishable goods can be stacked against said second penetratable wall to establish a supply air duct extending along the length of the container between the two rows of goods, blower means mounted in each return air duct for drawing air from said supply duct through an adjacent row of goods and delivering said return air into said mixing chamber at a higher pressure.

2. The enclosure of claim 1 wherein a plurality of blower units are mounted within each return duct adjacent the mixing chamber.

3. The enclosure of claim 2 wherein the blowers within each return duct are stacked one above the other.

4. The enclosure of claim 3 wherein each blower in each return duct is secured to a mounting bracket affixed to an adjacent side wall of said container.

5. The enclosure of claim 3 wherein each blower is arranged to force return air into the mixing chamber under a positive pressure.

\* \* \* \* \*